United States Patent
Suleiman et al.

(10) Patent No.: US 11,434,817 B2
(45) Date of Patent: Sep. 6, 2022

(54) SYSTEMS FOR SUPPLYING LIQUID FUEL EMULSION TO A COMBUSTION SYSTEM OF A GAS TURBINE

(71) Applicant: General Electric Company, Schenectady, NY (US)

(72) Inventors: Baha Suleiman, Temple Terrace, FL (US); Maher Aboujaib, Evette Salbert (FR); Pierre Montagne, Lay-Saint-Christophe (FR); Paul Burchell Glaser, Greenville, SC (US); Sundar Amancherla, Al-Khobar (SA)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 16/154,815

(22) Filed: Oct. 9, 2018

(65) Prior Publication Data

US 2019/0107049 A1   Apr. 11, 2019

(30) Foreign Application Priority Data

Oct. 10, 2017 (FR) .................................. 1759474

(51) Int. Cl.
*F02C 3/30* (2006.01)
*F23R 3/28* (2006.01)
(Continued)

(52) U.S. Cl.
CPC ............. *F02C 3/305* (2013.01); *F02C 3/24* (2013.01); *F02C 7/236* (2013.01); *F23D 11/16* (2013.01);
(Continued)

(58) Field of Classification Search
CPC ...................................................... F23K 5/12
See application file for complete search history.

(56) References Cited

U.S. PATENT DOCUMENTS 2,936,028 A * 5/1960 Loft ..................... F04C 14/00
                                                      137/115.01
3,615,290 A * 10/1971 Nixon ..................... C10L 1/00
                                                      44/301
(Continued)

FOREIGN PATENT DOCUMENTS

EP        0982543 A1 *  3/2000  ............... F23K 5/12
EP        2532959 A2   12/2012
(Continued)

OTHER PUBLICATIONS

French Search Report Corresponding to Application No. 1759474 dated Jun. 4, 2018.

*Primary Examiner* — Todd E Manahan
*Assistant Examiner* — Marc J Amar
(74) *Attorney, Agent, or Firm* — Dority & Manning, P.A.

(57) ABSTRACT

Liquid fuel supply system (12) for a combustion system (14), in particular a gas turbine, including at least one storage tank (16) for liquid fuel supplying at least one injector (34) connected to a combustion chamber (32) of the combustion system (14), said liquid fuel supply system (12) including a first piping section (18) disposed downstream of the tank (16) and a second piping section (20) disposed downstream of the first piping section (18) and upstream of fuel nozzle (34) in each combustion chamber (32), said first piping section (18) including at least one pressurizing means (22), and at least one injecting point or entering (24) for a water-soluble product, and the second piping section (20) including a mixing and distribution flow device (26) configured to create an emulsion and distributing the emulsion flow rate to at least one piping (28) connected to said nozzle (34).

9 Claims, 2 Drawing Sheets

Figure 1:
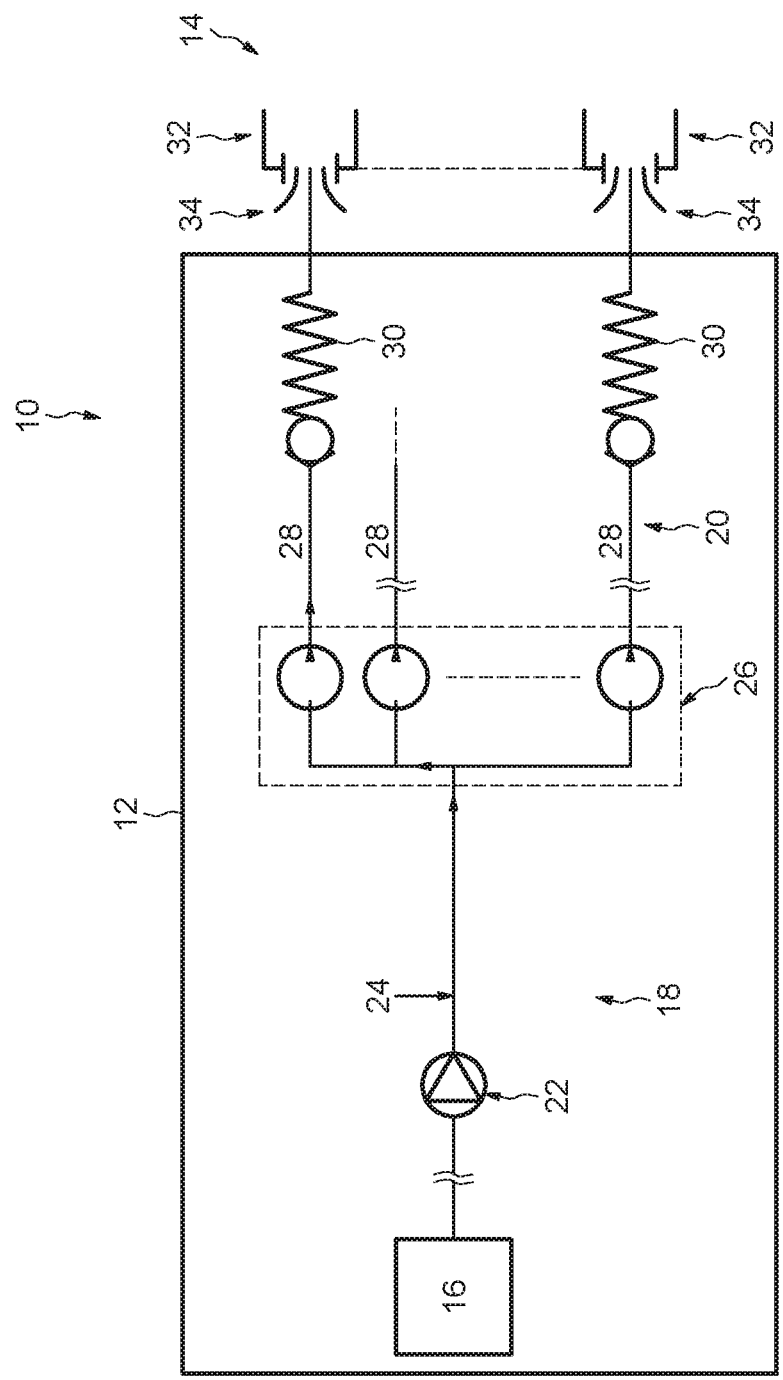

(51) Int. Cl.
*F23L 7/00* (2006.01)
*F23D 11/38* (2006.01)
*F23D 11/16* (2006.01)
*F02C 7/236* (2006.01)
*F02C 3/24* (2006.01)

(52) U.S. Cl.
CPC .............. *F23D 11/38* (2013.01); *F23L 7/002* (2013.01); *F23R 3/286* (2013.01)

(56) References Cited

U.S. PATENT DOCUMENTS

| | | | | |
|---|---|---|---|---|
| 3,696,638 | A * | 10/1972 | Smith | F16D 3/227 |
| | | | | 464/146 |
| 3,738,104 | A * | 6/1973 | Rosa | F02C 7/228 |
| | | | | 60/39.281 |
| 3,876,363 | A * | 4/1975 | La Haye | F23G 7/05 |
| | | | | 431/11 |
| 3,921,389 | A * | 11/1975 | Kawaguchi | F02C 3/30 |
| | | | | 60/775 |
| 4,110,973 | A * | 9/1978 | Haeflich | B01F 5/0475 |
| | | | | 261/118 |
| 4,214,435 | A * | 7/1980 | Campbell | F02C 3/30 |
| | | | | 60/39.465 |
| 4,388,893 | A * | 6/1983 | Apfel | F02M 25/0228 |
| | | | | 123/25 J |
| 4,424,148 | A * | 1/1984 | Rosenstiel | C04B 24/32 |
| | | | | 524/6 |
| 4,687,491 | A * | 8/1987 | Latty | C10L 1/328 |
| | | | | 122/31.1 |
| 4,696,638 | A * | 9/1987 | DenHerder | C10L 1/328 |
| | | | | 431/4 |
| 5,175,994 | A * | 1/1993 | Fox | F23K 5/06 |
| | | | | 60/39.58 |
| 5,372,613 | A * | 12/1994 | Mekonen | C10L 1/328 |
| | | | | 44/301 |
| 5,447,551 | A * | 9/1995 | Huestis | C21B 13/029 |
| | | | | 75/414 |
| 5,628,184 | A * | 5/1997 | Santos | F02C 7/228 |
| | | | | 60/39.281 |
| 6,149,544 | A * | 11/2000 | Masberg | B60L 1/003 |
| | | | | 477/13 |
| 8,262,752 | B2 * | 9/2012 | Popham | F17D 1/08 |
| | | | | 48/61 |
| 9,523,311 | B2 * | 12/2016 | Carroni | F02C 3/30 |
| | | | | 137/1 |
| 2005/0229871 | A1 * | 10/2005 | Robertson | F24D 3/08 |
| | | | | 122/32 |
| 2010/0242490 | A1 * | 9/2010 | Symonds | F02C 3/305 |
| | | | | 60/775 |
| 2010/0276165 | A1 * | 11/2010 | Hobson | A62C 3/07 |
| | | | | 169/45 |
| 2012/0305086 | A1 * | 12/2012 | Zhang | F02C 3/30 |
| | | | | 137/1 |
| 2016/0238422 | A1 * | 8/2016 | Wee | G01F 1/74 |
| 2017/0191423 | A1 * | 7/2017 | Scipio | C04B 24/32 |
| | | | | 524/6 |
| 2018/0142570 | A1 * | 5/2018 | Healey | F17D 1/08 |
| | | | | 48/61 |
| 2020/0018231 | A1 * | 1/2020 | Ito | C10L 1/00 |
| | | | | 44/301 |

FOREIGN PATENT DOCUMENTS

| | | | | |
|---|---|---|---|---|
| FR | | 2682161 A1 * | 4/1993 | ................ F02C 3/30 |
| JP | | 2006009631 A | 1/2006 | |
| WO | WO2010070692 A1 | | 6/2010 | |

\* cited by examiner

SYSTEMS FOR SUPPLYING LIQUID FUEL EMULSION TO A COMBUSTION SYSTEM OF A GAS TURBINE

CROSS-REFERENCE TO RELATED APPLICATIONS

This application claims the benefit of priority to French Patent Application No. 1759474, filed on Oct. 10, 2017, the disclosure of which is incorporated by reference herein in its entirety.

FIELD

The invention relates to combustion systems and, more particularly, the systems for supplying liquid fuel to a combustion device, such as in boilers or gas turbines for generating electricity.

In particular, the present invention relates to liquid fuel supply system configured to generate an emulsion upstream of the combustion system. By "emulsion" is meant a heterogeneous medium consisting of a dispersion, in the form of small droplets of a first liquid in a second liquid in a continuous phase. The two liquids are normally immiscible, for example, water and oil. However, by using a specific operation (stirring, mixing or by addition of active agents), the mixing can have a macroscopically homogeneous but macroscopically heterogeneous.

BACKGROUND

In general, a combustion system includes one or more combustion chambers each including one or more nozzles or injectors configured to inject gaseous and/or liquid fuels into the combustion chamber.

A fuel supply system generally includes a pump disposed between a fuel source and the nozzles and allowing the fuel to be pressurized to compensate the pressure drop in the system and the back pressure from the combustion chamber. The liquid fuel supply system also includes a filtration device for separating particles or contaminants from the fuel and at least one fuel flow distribution device in the combustion chambers, as well as isolation devices, such as automatic shut off valves, to isolate fuel supply system from combustion.

In order to increase combustion efficiency, it is necessary to add additives in the combustion chamber or in the fuel supply system. For example, water or steam injection reduces nitrogen oxide emissions in an equal amount of water and fuel oil, while magnesium additives help to inhibit the presence of vanadium corrosion in the liquid fuel during combustion in the combustion chamber in a mass ratio of Manganese/Vanadium equal to 3.

Use of these additives requires certain conditions in term of flow rate and/or suspension in the fuel. In order to ensure a homogeneous mixture of two immiscible liquids while having a macroscopically homogeneous but macroscopically heterogeneous appearance allowing thus an emulsion. For that, one of the substances is dispersed in the second in the form of small droplets and an emulsifier allowing a stable mixture. The major difficulty of emulsions is their stability over time thus an emulsifier could be added such as a surfactant. In order to ensure a stable emulsion over time, it is known to reduce the particle size in the discontinuous phase. However, the smaller the size of droplets, the more energy is needed to obtain an emulsion.

Several devices are known for producing an emulsion, for example an agitator, a high-pressure homogenizer, or a turbo emulsifier.

The high-pressure homogenizer makes it possible to obtain particle sizes of less than 500 nm, it includes a piston pump that push the fluid to emulsify through an adjustable orifice, called homogenizing group. The smaller the diameter of the orifice, the higher the pressure. At the passage of this obstacle, the fluid undergoes various constraints such as turbulence, cavitation, shearing which will then cause the dislocation of the fluid particles of the discontinuous phase.

Reference can be made to JP 2006 009 631 which discloses a simple mixing device capable of generating an emulsion of a liquid oil/water mixture and making possible to reduce the emissions of nitrogen oxide in the combustion of a fuel in a diesel motor. The mixing device is disposed upstream of a mixing tank connected to combustor nozzle.

It is also known to use static mixers or mixing device in order to produce an emulsion. However, the stability of the emulsion of such static mixers is not satisfactory. In addition, the mixing device must be arranged at the upstream of each combustion chamber and require a constant flow of compressed air, which increases the size of the fuel supply system.

There is therefore a need to create an effective and stable emulsion over time allowing online fuel supply to combustion system.

The object of the present invention is to provide a fuel supply system capable of creating an online emulsion of immiscible liquids, such as a hydrocarbon and at least one aqueous solution, for example, between 1% and 50% of the total flow, such as between 1% and 10% the total flow, preferably equal to 5% of the total flow.

Another object of the present invention is to simplify the processes of emulsion generation while ensuring a homogeneous distribution of the flow rate of the emulsion into each combustion chambers and limiting the dispersion of the characteristics of the emulsion in each flow, ensuring thus the effects of the water-soluble mixture into each combustion chamber.

BRIEF DESCRIPTION

Aspects and advantages of the invention will be set forth in part in the following description, or may be obvious from the description, or may be learned through practice of the invention.

The subject of the present invention is a liquid fuel supply system for a combustion system, in particular a gas turbine engine, including at least one liquid fuel storage tank supplying at least one nozzle connected to a combustion chamber.

The liquid fuel supply system including a first piping section disposed downstream of the tank and a second piping section disposed downstream of the first pipe section and upstream of said nozzle. The first piping section includes at least one pressurizing means, such as a pump, and at least one point of injection or entry for a water-soluble product, such as for example water or water-soluble base product such as an additive. The water-soluble product is, for example, in a volume of between 1% and 50% of the total flow rate in the first piping section, such as between 1% and 10% of the total flow rate in the first piping section, preferably equal to 5% of the total flow rate.

The second piping section includes a mixing and a flow rate distribution device to create an emulsion in the mixing and distribution device and distribute the emulsion flow to at least one nozzle in the connected combustion chamber.

In addition, the first piping section is configured to obtain a flow rate regime at the inlet of the mixing and distribution device having a Reynolds number greater than or equal to 2000, between 2000 and 3000 (transient regime), or greater than 3000 (turbulent regime). It was observed that if the first section is configured to ensure either transient or turbulent regime at the inlet of the first mixing and distribution device then the variability of the concentration of the water-soluble product in the hydrocarbon emulsion is maximum +/−30% of dispersion of the characteristics between the different emulsion flow rates after the mixing and distribution device.

The Reynolds number is a dimensionless number used in fluid mechanics to characterize a flow, in particular the nature or regime of flow (laminar, transient, turbulent). The Reynolds number represents the ratio of inertial forces to viscous forces.

According to one embodiment, the diameter of the first piping section, in particular the section situated between the injection point and the mixing and distribution device, is sized to obtain a flow rate and regime at the inlet of the mixing and distribution device having a Reynolds number greater than or equal to 2000.

The Reynolds number associated with the flow regime in a fluid in a piping is calculated as a function of the density, the viscosity and the average velocity of the fluid and the diameter of the piping.

Similarly, in general, a turbulent regime can be obtained by the roughness of the walls of the pipe, by the injection mode in the piping section of the water soluble product, or by the characteristics of the injector.

According to another embodiment, the first piping section includes a second mixing device disposed downstream of the injection point of the water-soluble product, between said injection point and the second section, and in particular upstream of the first mixing and distribution device. The second mixing device contributes to the formation of a pre-emulsion and makes it possible to control the regime of flow rate at the inlet of the first mixing and distribution device.

The second mixing device may be, for example, a gear pump or a static mixer. Advantageously, the injection point of the water-soluble product is located downstream of the pressurizing means and upstream of the second piping section.

For example, the second section of piping includes a shut-off device, for example, a check valve located upstream of the injector, to isolate the fuel system from the combustion system when the pressure in the fuel supply system is lower than the static pressure in the combustion system.

According to one embodiment, the second piping section includes a plurality of piping each one supplying a nozzles in each combustion chambers, the plurality of piping being connected to the first mixing and flow distribution device in order to ensure a homogeneous distribution of the flow rate of the emulsion to the combustion chambers while keeping a satisfactory concentration of the water-soluble product in the hydrocarbon emulsion in each piping supplying nozzles, while having a variability of maximum plus or minus 30%.

The first mixing and flow distribution device may include a gear pump and a plurality of outlets port connected to at least one combustion chambers.

According to a second aspect, the invention relates to a system for generating electricity, such as for example a boiler or a gas turbine, including a combustion system and at least one fuel supply system as described above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which:

FIG. 1 illustrates an electricity generating system including a fuel supply system according to a first embodiment of the invention; and FIG. 2 illustrates an electricity generating system including a fuel supply system according to a second embodiment of the invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As illustrated in FIG. 1, an electricity generating system, such as a boiler or a gas turbine, referenced as a whole, includes a liquid fuel supply system 12 and a combustion system 14 connected to the fuel system 12.

The fuel supply system 12 includes a liquid fuel storage tank 16, a first piping section 18 disposed downstream of the tank 16 and a second piping section 20 disposed downstream of the first piping section 18.

The first piping section 18 includes fuel treatment means (not shown) such as, filtration means (not shown), and at least one pressurizing means 22, such as for example a pump. An injection point 24 for a water-soluble product, such as for example water or water-soluble base product such as an additive, is located downstream of the pressurizing means 22 and upstream of the second section of piping 20.

The first piping section 18 has a diameter D making it possible to obtain a regime with a Reynolds number Re of at least 2000, preferably between 2000 and 3000 (transient regime), and for example greater than 3000 (turbulent regime).

The Reynolds number Re is a dimensionless number used in fluid mechanics to characterize a flow, in particular the nature of its regime (laminar, transient, turbulent). The Reynolds number represents the ratio of inertial forces to viscous forces.

The Reynolds number associated with the flow of a fluid in the first piping section 18 is calculated as a function of the density $\mu$, the viscosity $\eta$ and the average velocity V of said fluid and the diameter D of the first piping section 18 according to the following equation:

$$Re = \frac{\mu \cdot V \cdot D}{\eta} \qquad \text{Eq. 1}$$

Equation Eq. 1 can also be written as follows:

$$Re = \frac{\mu \cdot V^2}{\eta\left(\frac{V}{D}\right)}$$

As illustrated in FIG. 1, the second piping section includes a mixing and flow distribution device 26 apt to create and to distribute the emulsion flow rate to a plurality of piping 28 each provided with shut-off devices 30, for example, a check valve for isolating the fuel supply system 12 from the combustion system 14 when the pressure in the supply system 12 is lower than the static pressure in the combustion system 14.

As illustrated, the combustion system 14 includes a plurality of combustion chambers 32 each connected to a piping 28 of the second section 20 of the fuel supply system 12 via a nozzle 34.

Note that the invention is not limited to a plurality of piping 28, nozzle 34 and combustion chambers 32 and could relate to a single conduit connected to a single combustion chamber by a single injector.

The second piping section 20 is arranged upstream of the nozzle 34. Thus, when the fuel supply system 12 is in operation, the water-soluble product is injected through the inlet 24 into the first section 18, the mixture is then transferred by the pressure generated by the pump 22 to the mixing and distribution device 26. The mixing and distribution device 26 ensures the formation of a stable emulsion and a distribution of the flow to the various nozzle 34 via the several piping 28. Besides, the regime upstream of said mixing and distribution device 26 is configured to promote an emulsion and ensure a variability of the concentration in flow rate to at least one duct 28.

The variability of the concentration of the water-soluble product in the hydrocarbon emulsion is maximum +/−30% between the different emulsion flow rates of the piping 28, since the first section 18 is configured to ensure a transient or turbulent regime at the inlet of the mixing and distribution device 26.

The mixing and distribution device 26 is, for example, a flow divider including at least one distribution chamber (not shown) including an internal flow distribution gears. Such a mixing and distribution device ensures a homogeneous distribution of flow rate to each nozzle in the combustion system, and thus obtain and control several emulsion flow rates without increasing the complexity of the fuel supply system to the combustion chambers without adding a dedicated device to generate an emulsion.

The liquid hydrocarbon and the water-soluble product are mechanically mixed while being transported by the rotating gears to produce the blended fuel.

Figure 2:
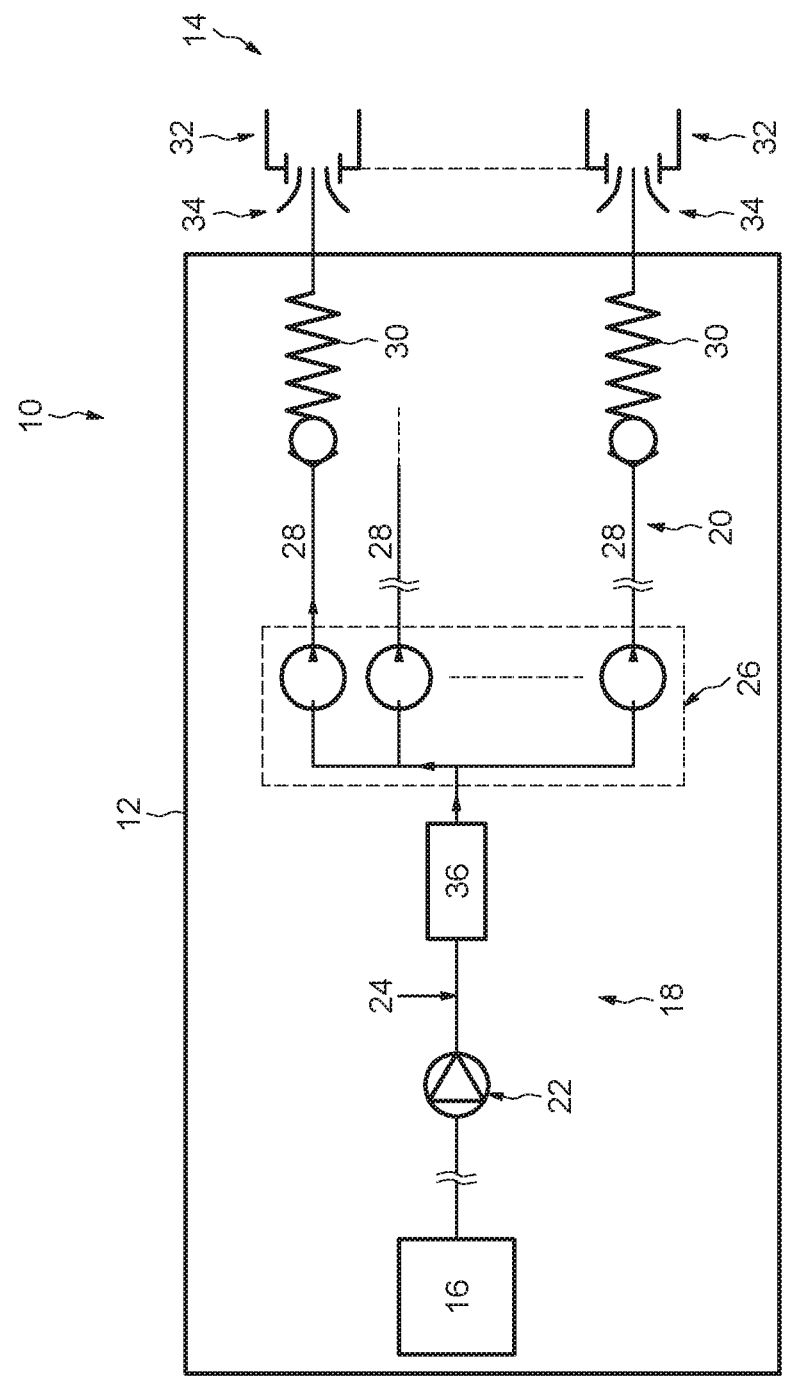

The fuel supply system of FIG. 2, in which we use the same references for the elements, but differs from the supply system of FIG. 1 only in that the first piping section 18 includes a second mixing device 36 located downstream of the injection point 24 of the water-soluble product, between said injection point 24 and the second section 20, in particular the first mixing and distribution device 26. The second mixing device 36 contributes to the formation of a pre-emulsion and makes it possible to control the regime of flow at the inlet of the first mixing and distribution device 26.

The second mixing device 36 could be, for example, a gear pump or a static mixer. Thus, it is possible to provide a regime with a Reynolds value (Re) greater than 2000 without adapting the diameter of the first piping section 18 downstream of the pressurizing means 22. Thus, the second mixing device 36 makes it possible to ensure first mixture of the hydrocarbon and the water-soluble product and creating a regime of Reynolds Re greater than 2000 upstream of the first mixing and distribution device 26. Thus, the variability of the concentration of the water-soluble product in the emulsion of the hydrocarbon is maximum +/−30% between the different emulsion flow rates of the piping 28 because the first section 18 is configured to ensure a transient or turbulent regime at the inlet of the first mixing and distribution device 26.

In general, the first piping section 18 is configured to obtain an inlet flow rate of the mixing and flow distribution device 26 having a Reynolds number greater than or equal to 2000, preferably between 2000 and 3000 transient), and for example greater than 3000 (turbulent regime), either by varying the diameter of the pipe section, especially between the injection point 24 and the first mixing device 26, or by integrating a second mixing device 36 between said injection point 24 and said first mixing device 26.

Thus, thanks to the arrangement of the mixing and distribution device 26 downstream of a piping section configured to have regime flow at the inlet of the mixing and flow distribution device 26 having a Reynolds number greater than or equal to 2000, an on-line emulsion of immiscible liquids is obtained which ensures a homogeneous distribution of the flow rate of the emulsion in each of the combustion chambers and is capable of maintaining a satisfactory concentration of the water-soluble product in the hydrocarbon emulsion in each of the piping respectively connecting nozzles in combustion chambers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A liquid fuel supply system for a combustion system, comprising at least one storage tank for liquid fuel capable of supplying the liquid fuel to at least one nozzle connected to a combustion chamber of the combustion system, the liquid fuel supply system comprising:
   a first piping section disposed downstream of the tank and a second piping section disposed downstream of the first piping section and upstream of the at least one nozzle, the first piping section having a first line that includes a pressurizing means and an injection point of water disposed downstream of the pressurizing means, the water and the liquid fuel forming a mixture within the first line downstream of the injection point;
   wherein the second piping section comprises a first mixing device, wherein the first mixing device is configured to create an emulsion and spread an emulsion flow to at least one piping connected to the at least one nozzle;

wherein a second mixing device is disposed on the first line downstream of the injection point and upstream of the first mixing device such that all of the mixture travels through the second mixing device before entering the first mixing device; and wherein the second mixing device is configured to provide an input flow rate regime to the first mixing device having a Reynolds number greater than or equal to 2000 such that a variability of a concentration of the water in the mixture is at maximum +/−1-30% between each piping in the at least one piping.

2. The liquid fuel supply system according to claim 1, wherein the input flow rate regime has a Reynolds number between 2000 and 3000.

3. The liquid fuel supply system according to claim 1, wherein, the input flow rate regime has a Reynolds number greater than or equal to 3000.

4. The liquid fuel supply system according to claim 1, wherein the second piping section comprises a shut off device upstream of a nozzle of the at least one nozzle.

5. The liquid fuel supply system according to claim 1, wherein the at least one piping comprises a plurality of pipes, wherein the combustion chamber is a first combustion chamber in a plurality of combustion chambers, and wherein each pipe in the plurality of pipes feeds a respective combustion chamber of the plurality of combustion chambers through a respective at least one nozzle, the plurality of pipes being connected to the first mixing device.

6. The liquid fuel supply system according to claim 1, wherein the water comprises a volume between 1% and 10% of a total flow rate in the first piping section.

7. An electricity generation system comprising:
a combustion system; and
a liquid fuel supply system comprising at least one storage tank for liquid fuel capable of supplying a liquid fuel to at least one nozzle connected to a combustion chamber of the combustion system, the liquid fuel supply system comprising a first piping section disposed downstream of the at least one tank and a second piping section disposed downstream of the first piping section and upstream of the at least one nozzle, the first piping section having a first line that includes a pressurizing means and an injection point of water disposed downstream of the pressurizing means, the water and the liquid fuel forming a mixture within the first line downstream of the injection point;

wherein the second piping section comprises a first mixing device, wherein the first mixing device is configured to create an emulsion and spread an emulsion flow to at least one piping connected to the at least one nozzle;

wherein a second mixing device is disposed on the first line downstream of the injection point and upstream of the first mixing device such that all of the mixture travels through the second mixing device before entering the first mixing device; and wherein the second mixing device is configured to provide an input flow rate regime to the first mixing device having a Reynolds number greater than or equal to 2000 such that a variability of a concentration of the water in the mixture is at maximum +/−30% between each piping in the at least one piping.

8. The electricity generation system according to claim 7, wherein the comprises a volume between 1% and 50% of a total flow rate in the first piping section.

9. A liquid fuel supply system for a gas turbine comprising:
a first piping section having a first line;
a second piping section extending from and fluidly coupled to the first piping section;
a fuel storage tank fluidly coupled to the first line of the first piping section for supplying a liquid fuel to the liquid fuel supply system;
a pump disposed downstream from the fuel storage tank;
an injection point of water downstream of the pump and fluidly coupled to the first line of the first piping section, the water and the liquid fuel forming a mixture within the first line;
a first mixing device disposed on the second piping section downstream from the injection point and the pump, wherein the first mixing device is fluidly coupled to the first line such that all of the water from the injection point and all the liquid fuel from the fuel supply system enter the first mixing device;
a plurality of nozzles each in fluid communication with a respective combustion chamber of a plurality of combustion chambers; and
a plurality of piping each extending from the first mixing device to a respective nozzle of the plurality of nozzles, wherein the first mixing device is configured to provide stable emulsion and distribution to each nozzle of the plurality of nozzles; and
a second mixing device disposed on the first line downstream of the injection point and upstream of the first mixing device such that all of the mixture travels through the second mixing device before entering the first mixing device;
wherein the second mixing device is configured to provide an input flow rate regime to the first mixing device having a Reynolds number greater than or equal to 2000 such that a variability of a concentration of the water in the mixture is at maximum +/−30% between each pipe in the plurality of pipes.

* * * * *